(12) United States Patent
Van Mourik et al.

(10) Patent No.: US 11,168,011 B2
(45) Date of Patent: Nov. 9, 2021

(54) PROCESS FOR THE TREATMENT OF WASTE WATER

(71) Applicant: SHELL OIL COMPANY, Houston, TX (US)

(72) Inventors: Arian Van Mourik, Amsterdam (NL); Kaushik Basak, Karnataka (IN); Nishith Verma, Kanpur U.P. (IN)

(73) Assignee: SHELL OIL COMPANY, Houston, TX (US)

( * ) Notice: Subject to any disclaimer, the term of this patent is extended or adjusted under 35 U.S.C. 154(b) by 350 days.

(21) Appl. No.: 16/303,695

(22) PCT Filed: May 23, 2017

(86) PCT No.: PCT/EP2017/062411
§ 371 (c)(1),
(2) Date: Nov. 21, 2018

(87) PCT Pub. No.: WO2017/202843
PCT Pub. Date: Nov. 30, 2017

(65) Prior Publication Data
US 2020/0331782 A1 Oct. 22, 2020

(30) Foreign Application Priority Data
May 25, 2016 (IN) .............................. 201641017964

(51) Int. Cl.
*C02F 1/72* (2006.01)
*B01J 21/18* (2006.01)
(Continued)

(52) U.S. Cl.
CPC ............. *C02F 1/725* (2013.01); *B01J 21/185* (2013.01); *B01J 23/72* (2013.01); *B01J 35/006* (2013.01);
(Continued)

(58) Field of Classification Search
CPC ...... C02F 1/725; C02F 1/74; C02F 2101/345; C02F 2103/36; C02F 2305/08;
(Continued)

(56) References Cited

U.S. PATENT DOCUMENTS

| 4,066,538 A | 1/1978 | Cines et al. |
| 4,970,189 A | 11/1990 | Tachibana |

(Continued)

FOREIGN PATENT DOCUMENTS

| CN | 1172776 A | 2/1998 |
| CN | 104307534 A | 1/2015 |

(Continued)

OTHER PUBLICATIONS

International Search Report and Written Opinion received for PCT Patent Application No. PCT/EP2017/062411, dated Jul. 31, 2017, 11 pages.

(Continued)

*Primary Examiner* — Jafar F Parsa
(74) *Attorney, Agent, or Firm* — Shell Oil Company (57) ABSTRACT

The invention provides a process for treating waste water from an industrial process for producing propylene oxide, which process comprises subjecting the waste water to a catalytic wet oxidation treatment in the presence of a catalyst comprising metal nanoparticles-doped porous carbon beads.

10 Claims, 3 Drawing Sheets

(51) Int. Cl.
| | |
|---|---|
| B01J 23/72 | (2006.01) |
| B01J 35/00 | (2006.01) |
| B01J 37/02 | (2006.01) |
| B01J 37/08 | (2006.01) |
| B01J 37/10 | (2006.01) |
| B01J 37/18 | (2006.01) |
| C02F 1/74 | (2006.01) |
| C02F 11/08 | (2006.01) |
| C02F 101/34 | (2006.01) |
| C02F 101/36 | (2006.01) |
| C02F 103/36 | (2006.01) |

(52) U.S. Cl.
CPC ....... *B01J 35/0013* (2013.01); *B01J 37/0201* (2013.01); *B01J 37/0238* (2013.01); *B01J 37/084* (2013.01); *B01J 37/088* (2013.01); *B01J 37/10* (2013.01); *B01J 37/18* (2013.01); *C02F 1/74* (2013.01); *C02F 11/08* (2013.01); *C02F 2101/345* (2013.01); *C02F 2101/36* (2013.01); *C02F 2103/36* (2013.01); *C02F 2209/08* (2013.01); *C02F 2305/08* (2013.01)

(58) Field of Classification Search
CPC ...... C02F 2209/08; B01J 21/185; B01J 37/10; B01J 35/006; B01J 37/088
See application file for complete search history.

(56) References Cited

U.S. PATENT DOCUMENTS

| | | | |
|---|---|---|---|
| 5,358,646 | A | 10/1994 | Gloyna et al. |
| 5,993,673 | A | 11/1999 | Evans et al. |
| 7,858,691 | B2 | 12/2010 | Zhang et al. |
| 8,197,790 | B2 | 6/2012 | Mitchell et al. |
| 8,501,011 | B2 | 8/2013 | Felch |
| 2001/0022290 | A1* | 9/2001 | Shiota ............ B01J 37/0205 210/749 |
| 2006/0137487 | A1 | 6/2006 | Mckinnon et al. |
| 2010/0018851 | A1 | 1/2010 | Choi et al. |
| 2010/0036176 | A1 | 2/2010 | Noronha et al. |
| 2010/0143718 | A1 | 6/2010 | Smalley et al. |
| 2011/0210282 | A1 | 9/2011 | Foley |
| 2012/0046162 | A1 | 2/2012 | Hoekstra et al. |
| 2012/0189846 | A1 | 7/2012 | Shah et al. |
| 2013/0319946 | A1 | 12/2013 | Sharma et al. |
| 2015/0005626 | A1 | 1/2015 | Kaneko |
| 2015/0056260 | A1 | 2/2015 | Verma et al. |

FOREIGN PATENT DOCUMENTS

| | | |
|---|---|---|
| CN | 104399460 A | 3/2015 |
| GB | 2262052 A | 6/1993 |
| JP | H11116218 A | 4/1999 |
| RU | 2456234 C2 | 7/2012 |
| WO | 9967003 A1 | 12/1999 |
| WO | 0100534 A1 | 1/2001 |
| WO | 0132561 A1 | 5/2001 |
| WO | 2006104222 A1 | 10/2006 |
| WO | 2008042095 A2 | 4/2008 |
| WO | 2009123755 A1 | 10/2009 |
| WO | 2009138530 A1 | 11/2009 |
| WO | 2010053468 A1 | 5/2010 |
| WO | 2015161187 A2 | 10/2015 |

OTHER PUBLICATIONS

International Search Report and Written Opinion received for PCT Patent Application No. PCT/EP2017/062462, dated Jul. 31, 2017, 13 pages.

Gallego et al., "The Use of Wet Oxidation and PACT for the Treatment of Propylene Oxide/Styrene Monomer (PO/SM) Industrial Wastewaters at the Repsol PO/SM Plant in Tarragona, Spain", CHISA 2002, Praha, The Czech Republic, Technical Report No. 429, Aug. 25-29, 2002, pp. 1-13, XP055391868.

Sharma et al., "Iron Doped Phenolic Resin Based Activated Carbon Micro and Nanoparticles by Milling: Synthesis, Characterization and Application in Arsenic Removal", Chemical Engineering Science, vol. 65, Mar. 16, 2010, pp. 3591-3601.

Saraswat et al., "Development of Novel in Situ Nickel-doped, Phenolic Resin-based Micro- Nano-Activated Carbon Adsorbents for the Removal of Vitamin B-12", Chemical Engineering Journal, vol. 197, May 23, 2012, pp. 250-260.

Khare et al., "Synthesis of Phenolic Precursor-based Porous Carbon Beads in Situ Dispersed With Copper-silver Bimetal Nanoparticles for Antibacterial Applications", Journal of Colloid and Interface Science, vol. 418, Mar. 15, 2014, pp. 216-224.

Talreja et al., "Removal of Hexavalent Chromium From Water Using Fe-grown Carbon Nanofibers Containing Porous Carbon Microbeads", Journal of Water Process Engineering, vol. 3, Sep. 1, 2014, pp. 34-45, XP055392737.

Kumar et al., "Chemical Vapor Deposition of Carbon Nanotubes: A Review on Growth Mechanism and Mass Production", Journal of Nanoscience and Nanotechnology, vol. 10, Issue No. 6, 2010, pp. 3739-3758.

Khare et al., "Carbon Nanofibers Containing Metal-doped Porous Carbon Beads for Environmental Remediation Applications", Chemical Engineering Journal, vol. 229, May 16, 2013, pp. 72-81, XP055391386.

Zhang et al., "The Effect of Phenol Wastewater Treatment with Potassium Permanganate Based Catalyst", Henan Science, vol. 33, Issue No. 6, Jun. 30, 2015, pp. 1004-1006.

Yang et al., "Development and Status Quo of Technology for Treating Waste Water of Propylene Oxide Production", Chemical Intermediate, vol. 10, Oct. 3, 2013, pp. 4-6.

Kehua et al., "Technology for Treating Waste Water of Propylene Oxide Production", Jiangsu Chemical Industry, vol. 29, Issue No. 5, Oct. 3, 2001, pp. 41-44.

Rodriguez et al., "Catalytic Wet Air Oxidation of Textile Industrial Wastewater Using Metal Supported on Carbon Nanofibers" The Journal of Supercritical Fluids, 46, 2008, pp. 163-172.

Colomer et al., "Purification of Catalytically Produced Multi-wall Nanotubes", Journal of the Chemical Society, Faraday Transactions, vol. 94, Issue No. 24, 1998, pp. 3753-3758.

Biro et al., "Catalyst Traces and Other Impurities in Chemically Purified Carbon Nanotubes Grown by CVD", Materials Science and Engineering: C, vol. 19, Issue Nos. 1-2, Jan. 2, 2002, pp. 9-13.

Yadav et al., "Carbon Bead-supported Copper-dispersed Carbon Nanofibers: an Efficient Catalyst for Wet Air Oxidation of Industrial Wastewater in a Recycle Flow Reactor", Journal of Industrial and Engineering Chemistry, vol. 67, 2018, pp. 448-460.

Yadav et al., "Removal of Phenol From Water by Catalytic Wet Air Oxidation Using Carbon Bead-supported Iron Nanoparticle—containing Carbon Nanofibers in an Especially Configured Reactor", Journal of Environmental Chemical Engineering, vol. 4, 2016, pp. 1504-1513.

Kolesnikov et al., "Solid Catalysts, Their Structure, Composition and Catalytic Activity: A Monograph", Gubkin Russian State University of Oil and Gas, 2000, pp. 372.

Zimmermann et al., "Zimpro® Wet Air Oxidation System: The cleanest way to treat the dirtiest water.", siemens, 1930, 8 pages.

Chisa 2002, Aug. 25-29, 2002, 15th International Congress of Chemical and Process Engineering, Final Program, 91 pages.

Kumar et al., "Development of Bi-metal Doped Micro- and Nano Multi-functional Polymeric Adsorbents for the Removal of Fluoride and Arsenic(V) from Wastewater", Desalination, 2011, 12 Pages.

Colomer et al., "Purification of Catalytically Produced Multiwall Nanotubes", Journal of the Chemical Society, Faraday Trans, vol. 94, Issue No. 24, 1998, pp. 3753-3758.

\* cited by examiner

COD Reduction of Waste Water from an SMPO Process using "Cu-CNF-CB-PhB" Catalyst

PROCESS FOR THE TREATMENT OF WASTE WATER

CROSS REFERENCE TO RELATED APPLICATIONS

This is a national stage application of International Application No. PCT/EP2017/062411, filed 23 May 2017, which claims benefit of priority to India Patent Application No. 201641017964, filed 25 May 2016.

FIELD OF THE INVENTION

The present invention relates to a process for the treatment of waste water, in particular waste water from industrial processes containing at least hydrocarbons and salts.

BACKGROUND OF THE INVENTION

The treatment or purification of waste water originating from industrial processes and containing at least hydrocarbons and salts (organic and/or inorganic) normally is a relatively expensive procedure. Environmental legislation nowadays puts stringent demands on the purification of waste water streams from industrial processes, particularly when the purified waste water is to be released into the environment. Accordingly, the choice of a purification method for industrial waste water is bound by practical, environmental and economic considerations.

Processes for the production of propylene oxide (PO) give rise to waste water streams that provide particular challenges with regard to purification. Propylene oxide may be produced by the direct oxidation of propylene with air or oxygen. As such direct oxidation tends to provide low yields of PO, PO is most commonly produced with the help of a chemical mediator.

One industrial process for the production of propylene oxide wherein a relatively large amount of waste water is produced is the styrene monomer/propylene oxide (SM/PO) production process. In general, SM/PO processes involve the steps of:

(i) reacting ethylbenzene with oxygen or air to form ethylbenzene hydroperoxide, (ii) reacting the ethylbenzene hydroperoxide thus obtained with propene in the presence of an epoxidation catalyst to yield propylene oxide and 1-phenyl ethanol, and (iii) converting the 1-phenyl ethanol into styrene by dehydration using a suitable dehydration catalyst. In the last step, water is produced. In addition to this reaction water, organic by-products such as aliphatic and aromatic hydrocarbons, aldehydes, ketones, alcohols, phenols and organic acids are produced. The by-products are separated from the main products with the aid of clean water and the organic acids are neutralized using a basic aqueous solution, such as an aqueous sodium (bi)carbonate and/or sodium hydroxide solution. Furthermore, additional water is introduced with the air in the step (i) and as steam in step (iii) of the above process.

The waste water from an SM/PO production plant typically contains a total of from 1.0 to 3.5 wt. % of non-salt organic compounds and from 3.0 to 6.0 wt. % of organic salts. It may further contain up to 2.0 wt. % of sodium carbonate and sodium bicarbonate and/or traces of sodium hydroxide, depending on the basic solution used in the neutralization of organic acids.

The output of waste water from an SM/PO plant can be tens of thousands kg per hour and this cannot be discharged without additional purification treatment. As has already been indicated above, however, the choice of a suitable purification treatment is limited due to practical, environmental and economic considerations.

Another phenyl hydroperoxide that can be used in production of propylene oxide is cumene hydroperoxide (2-hydroperoxypropan-2-ylbenzene), typically obtained by reacting cumene ((1-methylethyl)benzene)) with oxygen or air. Cumene hydroperoxide is reacted with propylene in the presence of an epoxidation catalyst to yield PO and cumyl alcohol (2-phenylpropan-2-ol). Cumyl alcohol, also referred to as dimethylphenylcarbinol (DMPC), is typically converted into cumene with the help of a heterogeneous catalyst and hydrogen, by hydrogenolysis. The cumene may then be re-used in the process.

Waste water originating from such processes may comprise oxygen-containing compounds having phenolic hydroxyl groups or carbonyl groups. Typical contaminants may include ketones such as acetone, ethylmethylketone and diethylketone, aldehydes such as formaldehyde, acetaldehyde and propionaldehyde, ethers, aromatic and non-aromatic alcohols such as phenols and methanol, chlorinated compounds such as dichloropropane and organic sodium salts such as sodium acetate, sodium formate, sodium benzoate, sodium propionate and sodium oxalate.

The purification of waste water streams originating from the production of propylene oxide presents particular challenges as such streams often have larger chemical oxygen (COD) demands than waste water streams originating from other chemical processes. For example, typical starting COD values for waste water streams originating from the production of propylene oxide are in the range of 80,000 to 125,000 mg/L. Therefore, purification methods for such waste water streams need to be able to reduce COD by significant amounts in absolute terms as well as percentage terms.

The typical purification method employed in industrial processes for the purification of waste water streams originating from the production of propylene oxide comprises a liquid phase oxidation with air or oxygen at high temperatures and pressures (a so-called Wet Air Oxidation (WAO) process).

Wet air oxidation is a well-known technology for treating process streams and was first developed in the 1930's by F. J. Zimmermann. This technology utilizes aqueous phase oxidation of process streams by oxygen-containing gas at elevated temperatures and pressures in order to oxidise inorganic contaminants and to convert organic contaminants to carbon dioxide, water and biodegradable short chain organic compounds.

Wet air oxidation is typically carried out for the purification of waste water streams originating from the production of propylene oxide using temperatures of greater than 300° C. and pressures of over 150 bar (15 MPa). Wet air oxidation generally effects a chemical oxygen demand (COD) removal of 60-70% from said waste water streams.

However, as the effluent from said wet air oxidation processes still has a significant COD (30-40% of the original COD), industrial processes for the purification of waste water streams originating from the production of propylene oxide often require additional downstream processing steps.

For example, such processes may employ a two-step process, wherein the first step comprises a liquid phase oxidation with air or oxygen at high temperatures and pressures (the so-called Wet Air Oxidation (WAO) process) and the second step comprises biochemical treatment.

In some purification processes, there may be further optional steps such as treatments with activated carbon prior to biochemical treatment. For example, U.S. Pat. No. 4,066, 538 A describes a process for treating waste water having a relatively high chemical oxygen demand (COD) caused by organic material that is predominantly soluble in water. Said process comprises treatment with activated carbon, followed by a biochemical treating operation.

Repsol has presented (CHISA 2002, Praha, Czech Republic, Aug. 25-29, 2002) a process for the treatment of propylene oxide/styrene monomer industrial waste waters, wherein the effluent from wet air oxidation is treated in a two-stage activated carbon treatment in which a homogeneous mixture of powdered activated carbon and biological solids treat the waste water in a synergistic fashion. It was indicated that the wet air oxidation treatment was carried out at 295° C., 95 bar (9.5 MPa) for 1.5 hours using compressed oxygen gas as the oxidant to effect a nominal COD reduction of 61%. The combined process of wet air oxidation, followed by activated carbon treatment and biological treatment described by Repsol is said to have effected an overall COD reduction of 98.9%.

However, multi-step processes comprising wet air oxidation and biochemical treatments suffer from high cost and other disadvantages including equipment reliability issues, corrosion, fouling and downtime due the extreme operating conditions that need to be employed during wet air oxidation and may produce other waste streams like spent activated carbon. Accordingly, over the years, there have been various alternative methods described for the purification of waste water streams originating from processes for the production of propylene oxide.

The purification process disclosed in GB 2,262,052 A involves freeze-concentration combined with salts-removal, whereby the waste water is separated into an at least two-fold concentrated waste product, salt crystals and a substantially pure water product. However, the economics of a freeze concentration process are not satisfactory and the capital investment required for a freeze concentration process at present still accounts for at least 10% of the total capital investment necessary for an SM/PO plant.

WO 99/67003 A1 discloses a process for treating of waste water streams containing at least hydrocarbons and salts to yield a clean water product, a concentrated brine product and a hydrocarbon-rich product, which process comprises the steps of:
(a) feeding the waste water feed into a first distillation column at a stage in the range of from 0.05*n to 0.15*n from the top, wherein n represents the total number of theoretical stages of the first distillation column and has a value in the range of from 20 to 40;
(b) drawing off a vapour stream at a stage in the range of from 0.55*n to 0.75*n from the top and feeding this vapour stream into the bottom of a second distillation column having m theoretical stages, with m having a value in the range of from 3 to 10;
(c) drawing off the clean water product as the top fraction from the second distillation column and drawing off a bottom stream from the second distillation column, which is fed back into the first distillation column below the draw off of the vapour stream in step (b) at a stage in the range of from 0.60*n to 0.85*n from the top;
(d) drawing off the concentrated brine product as the bottom fraction of the first distillation column; and
(e) drawing off the hydrocarbon stream as the top fraction of the first distillation column. The process of WO 99/67003 A1 is said to require 10-50% lower capital investment than for freeze concentration processes as disclosed in GB 2,262,052 A, whilst also achieving good purification.

U.S. Pat. No. 5,993,673 A describes a process for purifying an aqueous purge stream from propylene oxide/styrene monomer production containing organic acids, peroxidic materials and ethyl benzene which comprises contacting the purge stream with a particulate solid catalyst comprised of iron-promoted alumina at conditions effective to decompose peroxidic materials, and recovering the treated stream reduced in peroxide content. Thereafter, the treated stream of U.S. Pat. No. 5,993,673 A may be stripped of ethyl benzene and then effectively biotreated.

WO 01/00534 A1 discloses an improved process for the treatment of a waste water feed containing organic contaminants, which process comprises as step (a), the freeze concentration process as described in GB 2262052 A, followed by (b) subjecting the resulting water stream to a reverse osmosis treatment thereby producing a purified water stream as the permeate and a relatively contaminated water stream as retentate. However, such a method may present potential difficulties in relation to solids handling rotating equipment can be sensitive to fouling.

WO 01/32561 A1 discloses an industrial process for producing propylene oxide, which process comprises the steps of:
(a) subjecting the waste water to a multi-effect evaporation treatment resulting in a vaporous top fraction and a liquid bottom fraction containing the non-volatile contaminants; and
(b) condensing at least part of the vaporous top fraction into a liquid stream which is subjected to a stripping treatment resulting in an overhead stream containing volatile waste organic material and purified water as the liquid bottom stream.

The purified water obtained by the process of WO 01/32561 A1 is sufficiently pure to be re-used in an industrial process as e.g. cooling water, but can also be subjected to a subsequent biotreatment resulting in a pure water stream, which may be sufficiently pure for discharge into surface water.

However, the process of WO 01/32561 A1 requires the evaporation of a very high fraction of water, thereby necessitating the high energy consumption and the use of high capacity distillation columns.

WO 2006/104222 A1 describes a method for treating a waste water containing oxygen-containing compound having a phenolic hydroxyl group or a carbonyl group, including a step of adding an alkali agent to the waste water containing the oxygen-containing compound having a phenolic hydroxyl group or a carbonyl group to control a pH of the waste water to 10 or more; and a step of separating a discharge in which the oxygen-containing compound having a phenolic hydroxyl group or a carbonyl group is concentrated through distillation of the waste water to which the alkali agent has been added.

WO 2009/138530 A provides a method for revaluation of aqueous waste streams generated in propylene oxide and styrene co-production processes, wherein said method comprises acidification of the aqueous waste stream with an inorganic acid at a pH of less than 4.5, separation of the two resulting phases at a temperature of greater than 40° C.; washing of the organic phase produced in the previous step with an aqueous solution of excess acid and separation of the two resulting phases.

However, the method described in WO 2009/138530 A presents a number of difficulties, including potential corrosion issues, acid handling and consumption, managing the organics dissolved in the aqueous phase and potential formation of esters with organic alcohols.

In spite of the amount of research that has been dedicated to the purification of waste water streams originating from processes to produce propylene oxide, there still remains a need to develop simpler, more cost effective waste water purification treatments that do not suffer from equipment reliability issues and which produce clean water streams that meet all requirements for discharge into the environment.

SUMMARY OF THE INVENTION

Surprisingly, in the present invention there has been found a specific catalyst for use in wet oxidation processes that allows waste water streams originating from processes for the production of propylene oxide to be purified under milder conditions and with extremely advantageous COD reduction, both in absolute and percentage terms.

Accordingly, the present invention provides a process for treating waste water from an industrial process for producing propylene oxide, which process comprises subjecting the waste water to a catalytic wet oxidation treatment treatment in the presence of a catalyst comprising metal nanoparticles-doped porous carbon beads.

DETAILED DESCRIPTION OF THE INVENTION

The waste water to be treated in the present invention may be derived from any process for the production of propylene oxide. However, in a preferred embodiment of the present invention, the waste water originates from a process for co-producing propylene oxide and styrene. Hitherto, such waste water streams have been very difficult to treat due to their very high CODs.

As described hereinbefore, wet oxidation processes are known in the art and comprise the oxidation of soluble or suspended components in an aqueous environment using oxygen as the oxidizing agent. When air is used as the source of oxygen the process is referred to as the wet air oxidation (WAO) process. Such oxidation reactions typically occur at temperatures in the range of from of 150 to 320° C., and at pressures in the range of from 1 to 22 MPa (150 to 3200 psi).

Wet air oxidation systems typically employ rotating equipment to raise the feed stream and air (or oxygen) to the required operating pressure. Heat exchangers are routinely employed to recover energy from the reactor effluent and use it to preheat the feed/air mixture entering the reactor. After start-up, since the oxidation reactions are exothermic, sufficient energy may be released in the reactor to allow the wet oxidation system to operate without any additional heat input.

As described hereinbefore, non-catalytic wet oxidation processes to purify waste water from propylene oxide production processes are not only high cost, but also suffer from other disadvantages including equipment reliability issues, corrosion, fouling and downtime due the extreme operating conditions that need to be employed.

However, it has been surprisingly found that the catalytic wet oxidation process of the present invention may advantageously be conducted under less extreme operating conditions, even for waste water streams having very high starting CODs.

In particular, the process of the present invention may be conveniently conducted at a temperature in the range of from 120 to 300° C. and a pressure in the range of from 2 to 15 MPa. Preferably, the process of the present invention may be conducted at a temperature in the range of from 150 to 280° C., more preferably in the range of from 180 to 240° C. and a pressure in the range of from 3 to 12 MPa, more preferably in the range of from 4 to 10 MPa.

As used herein, the term "bead" can refer to a particle or nanoparticle. The size of a particle or nanoparticle is as described herein or as context dictates.

The catalyst employed in the process of the present invention comprises metal nanoparticles-doped porous carbon beads. That is to say, catalysts for use in the process of the present invention comprise one or more metals incorporated within polymeric beads. The one or more metals can, for example, be incorporated into the beads during a polymerization step.

Preferably, the metal therein is selected from one or more of aluminium, iron, nickel, copper, silver, cobalt, molybdenum, gold and platinum. More preferably, the metal is selected from one or more of iron, nickel, copper and cobalt. Most preferably, the metal is selected from one or more of nickel, copper and cobalt. Copper is a particularly preferred metal in the catalyst.

In some embodiments, a combination of metals or salts thereof may be conveniently incorporated into the beads. Examples of preferred combinations include, but are not limited to, iron and copper, copper and nickel, and nickel and iron.

Examples of metal salts that can be incorporated into polymeric beads include, but are not limited to, aluminum nitrate, ferric chloride, nickel nitrate, cupric chloride, silver nitrate, cobalt nitrate, molybdenum nitrate, gold chloride, platinum chloride or any combination thereof.

The catalyst for use in the process of the present invention may be generally prepared according to suspension polymerization methods known in the art. For example, A. Sharma et al., Chem. Eng. Sci. 65 (2010) 3591-3601, R. Saraswat et al., Chem. Eng. J. 197 (2012) 250-260, US 2013/0319946 A1, P. Khare et al., J. Colloid. Interface Sci. 418 (2014) 216-224, and US 2015/005626 A1 describe the preparation of various metal nanoparticles-doped porous carbon beads.

Metal nanoparticles-doped porous carbon beads for use as a catalyst in the process of the present invention are generally prepared by a method comprising: —(i) preparing a mixture of one or more aromatic alcohol monomers and/or non-aromatic monomers, solvent, polymerization catalyst, crosslinking agent, suspension stabilizing agent and one or more metal salts, under conditions sufficient to produce polymeric beads doped with one or more metals or salts thereof; and (ii) carbonizing, activating and then reducing the polymeric beads produced in step (i) to produce metal nanoparticles-doped porous carbon beads.

Aromatic alcohol monomers that may be conveniently used in step (i) may be selected from one or more of phenol, vinyl benzyl alcohol, cresol and butylphenol. A particularly preferred aromatic alcohol monomer is phenol.

A preferred non-aromatic monomer that may be conveniently used in step (i), alone or in combination with one or more aromatic alcohol monomers or other non-aromatic monomers is methyl methacrylate (MMA).

The solvent that may be utilised in preparing the catalyst is not limited and may be any organic solvent or a solvent that is appropriate for the monomers being used to synthesize the polymeric beads. Examples of solvents that may be conveniently used include, but are not limited, formaldehyde, acetaldehyde, paraldehyde, and glyoxal, or any combination thereof.

The polymerization catalyst may be a base catalyst, and in particular, amine catalysts. Examples of polymerization catalysts that may be conveniently used include, but are not limited to, triethylamine (TEA), sodium hydroxide, barium hydroxide, dimethylamine, which can be used alone or in combination with other catalysts.

Cross-linking agents that may be conveniently used in step (i) include hexamethylenetetramine (also known as HMTA or hexamine), triethylene diamine and sulfuric acid, or any combination thereof.

Suspension stabilizing agents that may be conveniently used in step (i) may be selected from one or more of poly vinyl alcohol (PVA), gum acacia powder (GAP) and poly vinyl pyrodinone. However, other suspension stabilizing agents can also be used and the list provided herein should not be considered limiting.

The order of addition and mixing of the components in step (i) is not limited. The components for use in step (i) may be added together simultaneously to yield the total reaction mixture for said step. Alternatively, one or more components for use in step (i) may be prepared as separate mixtures and then added together to yield to total reaction mixture.

For example, one convenient non-limiting method of preparing the catalyst for use in the process of the present invention comprises heating the monomers, solvent, and polymerization catalyst to form a heated mixture. In some embodiments, the monomers, solvent, and polymerization catalyst may be mixed at room temperature (e.g. 20-30° C.) until the mixture is homogeneous. The mixture can then be heated to a temperature of about 100° C. The mixture can be heated at any rate, including but not limited to 1, 2, 3, 4, or 5° C./minute. After the mixture is heated, the heated mixture may be contacted with a solvent to yield a first mixture. In some embodiments, the solvent is water. In some embodiments, the first mixture is mixed for about, or at least, 10, 20, 30, 40, 50, or 60 minutes. The first mixture may then be contacted with a cross-linking agent. Contacting the first mixture with a cross-linking agent will yield a cross-linked mixture. In some embodiments, after contacting the first mixture with a cross-linking agent, the mixture is heated. In some embodiments, the mixture is heated until the temperature reaches about 70, 80, 90, 100, or 110° C. The temperature can be increased, for example, at a rate of about 1, 2, 3, 4, or 5° C./minute until the target temperature is reached. The cross-linked mixture may then be contacted with a suspension stabilizing agent to yield a second mixture. In some embodiments, the suspension stabilizing agent and cross-linked mixture can be mixed for about, or at least, 10, 15, 20, 25, 30, 35, 40, 45, 50, 55, or 60 minutes. The second mixture may then be contacted with one or more metals or salts thereof to yield a third mixture. In some embodiments, the third mixture can then be heated. After heating the third mixture, the mixture is cooled to produce a composition comprising the polymeric beads. When more than one metal is to be incorporated into the beads, said metals can be added sequentially or simultaneously. For example, in some embodiments wherein multiple metals are to be incorporated into the beads, the metals may be added at different times, such as about, or at least, 1, 2, 3, 4, 5, 6, 7, 8, 9, or 10 minutes apart. In some embodiments, wherein multiple metals are to be incorporated into the beads, the metals may be added about 1 to 10, 1 to 9, 1 to 8, 1 to 7, 1 to 6, 1 to 5, 1 to 4, 1 to 3, or 1 to 2 minutes apart. In some embodiments, wherein multiple metals are to be incorporated into the beads, the metals may be added about 2 to 10, 2 to 9, 2 to 8, 2 to 7, 2 to 6, 2 to 5, 2 to 4, or 2 to 3 minutes apart. In some embodiments, wherein multiple metals are to be incorporated into the beads, the metals may be added about 3 to 10, 3 to 9, 3 to 8, 3 to 7, 3 to 6, 3 to 5, 3 to 4 minutes apart. In some embodiments, wherein multiple metals are to be incorporated into the beads, the metals may be added about 4 to 10, 4 to 9, 4 to 8, 4 to 7, 4 to 6, or 4 to 5 minutes apart. In some embodiments, wherein multiple metals are to be incorporated into the beads, the metals may be added about 5 to 10, 5 to 9, 5 to 8, 5 to 7, or 5 to 6 minutes apart.

In embodiments wherein multiple metals are to be incorporated into the beads, the metals may be added in different ratios to one another. In some embodiments, the first metal (or salt thereof) is added in a 3:1, 1:1, or 1:3 ratio to a second metal (or salt thereof). Other ratios may also be used to affect the final amount of each metal that is incorporated into the polymeric beads.

After the one or more metals or salts thereof are added, the reaction mixture can be continued to be heated. In some embodiments, the mixture is stirred. In some embodiments, the rate of mixing is kept constant. Without wishing to be bound by any theory, the rate of mixing is kept constant to avoid solidification of the beads. The mixture containing the one or more metals or salts thereof can be heated, for example, for about, or at least, 1, 2, 3, 4, 5, 6, 7, 8, 9, or 10 hours. In some embodiments, the mixture is heated for about 1 to 10, 1 to 9, 1 to 8, 1 to 7, 1 to 6, 1 to 5, 1 to 4, 1 to 3, or 1 to 2 hours. In some embodiments, after heating, the mixture is allowed to cool. The cooling can be accelerated by incubating the mixture in a cooling bath or the reaction be cooled by exposing the reaction or reaction vessel to the ambient temperature.

In some embodiments, the polymeric beads comprising the one or more metals or salts thereof are isolated. The beads can be isolated once the reaction reaches room temperature. Any method of isolation can be used. In some embodiments, isolating the polymeric beads comprises filtration of the polymeric beads. In some embodiments, the method also comprises fractionating the polymeric beads to produce a composition comprising polymeric beads of substantially uniform diameter. Fractionating the beads based upon size allows the beads to be grouped according to a specific size or range of sizes. Any method of fractionating, such as but not limited using sieves, can be used. The isolated beads can also be washed with various solutions, such as, but not limited to, water, alcohol, acetone, and the like. In some embodiments, the beads are washed with water, methanol, or acetone, or any combination thereof. In some embodiments, the washing alcohol is ethanol, methanol, isopropanol, or any combination thereof.

In step (ii), the polymeric beads formed in step (i) are carbonized, for example, in a ceramic boat at a sufficient temperature and for a sufficient amount of time. In some embodiments, the beads are carbonized at a temperature in the range of from 900 to 1100° C., for example, at a temperature of about 900, 1000, 1050, or 1100° C. In some embodiments, the beads are carbonized for about 10, 20, 30, 40, 50, 60, 70, 80, 90, 100, 110, or 120 minutes. In some embodiments, the beads are carbonized in $N_2$ atmosphere. Other inert gases can also be used. In some embodiments, prior to the carbonization, the beads are pre-heated from room temperature to the carbonization temperature at a heating rate of about 1, 2, 3, 4, or 5° C./minute.

After carbonization, the beads are activated. Activation of the beads can be performed in the same furnace that is used to carbonize the beads, but need not be. In some embodiments, the carbonized beads are activated by steam. In some embodiments, the beads may be activated at a temperature in the range of from 800 to 1100° C. In some embodiments, the beads may be conveniently activated at a temperature of about 800, 850, 900, 950, 1000, 1050, or 1100° C. In some embodiments, the carbonized beads are activated for about 10, 20, 30, 40, 50, 60, 70, 80, 90, 100, 110, or 120 minutes. In some embodiments, the beads are carbonized at a temperature of about 850° C. and the beads are activated at a temperature of about 1000° C.

The activated beads are then subjected to reduction by hydrogen. Reduction of the beads can be performed in a similar furnace as that used to carbonize and activate the beads. The activated beads are reduced at 350° C. for 3 hours, thereby converting oxides of metals in the beads to the metallic state.

The metal nanoparticles-doped porous carbon beads that are produced by the methods described herein may have various sizes. However, it is preferred that the beads have a relatively uniform size distribution. If necessary, the beads can be manipulated, for example by milling or filtration, to reduce their size.

Preferably, beads for use as catalyst in the process of the present invention have diameters in the range of from 0.1 to 0.8 mm, more preferably in the range of from 0.2 to 0.8 mm. The bead diameters may be conveniently selected using sieves.

It is particularly preferred that the beads have an average diameter of in the range of from 0.3 to 0.5 mm, and most preferably approximately 0.5 mm.

As mentioned hereinbefore, the polymeric beads are doped with one or more of aluminium, iron, nickel, copper, silver, cobalt, molybdenum, gold and platinum or salt(s) thereof. In embodiments wherein the polymeric beads are doped with two of the afore-mentioned metals or salts thereof, then the ratio of the two metals, or salts thereof, is preferably about 1:1, 1:2, 1:3, or 1:4.

In the present invention, it has been surprisingly found that the metal nanoparticles-doped porous carbon beads described hereinbefore, have particular efficacy as a catalyst in processes for treating waste water originating from an industrial process for producing propylene oxide. Accordingly in the process of the present invention, waste water originating from an industrial process for producing propylene oxide is subjected to a catalytic wet oxidation treatment treatment in the presence of a catalyst comprising metal nanoparticles-doped porous carbon beads.

However, in a preferred embodiment of process of the present invention, the catalyst comprising metal nanoparticles-doped porous carbon beads, further comprises carbon nanofibers.

Thus, in a preferred embodiment of the present invention, the catalyst is prepared by a method comprising steps (i) and (ii) as hereinbefore described, which method further comprises a third step, step (iii), of subjecting the metal nanoparticles-doped porous carbon beads to chemical vapour deposition (CVD) in the presence of a carbon source to produce metal nanoparticles-doped porous carbon beads which comprise carbon nanofibers.

In a preferred embodiment of the present invention the carbon source is selected from acetylene, benzene, xylene and toluene.

Methods for incorporating carbon nanofibers in metal nanoparticles-doped porous carbon beads are known in the art. For example, P. Khare et al., Chem. Eng. J. 229 (2013) 72-81 and N. Talreja et al., J. Water Process. Eng. 3 (2014) 34-45 both describe methods to grow carbon nanofibers on porous carbon beads.

A typical CVD set-up may consist of a nickel alloy tubular reactor (ID=30 mm, L=0.8 m) placed horizontally in an electric furnace equipped with a temperature controller and programmer. Approximately 20 g of the beads that have been pre-carbonized, activated and H2-reduced may be placed on a perforated stainless steel (SS) boat inserted into the reactor. Acetylene gas at a flow rate of 50 sccm (cm$^3$/min at standard temperature and pressure) was passed through the tubular reactor for CVD and the growth of carbon nanofibers (CNFs) on the activated carbon beads. The incorporated metal nanoparticles within the carbon beads act as the catalyst for the CVD. CVD may be performed at 350° C. for 30 minutes in the presence of acetylene in order to decorate the beads with multi-scale carbon structures in the form of carbon nanofibers (CNFs) at 0.1-0.15 MPa pressure.

Figure 1:
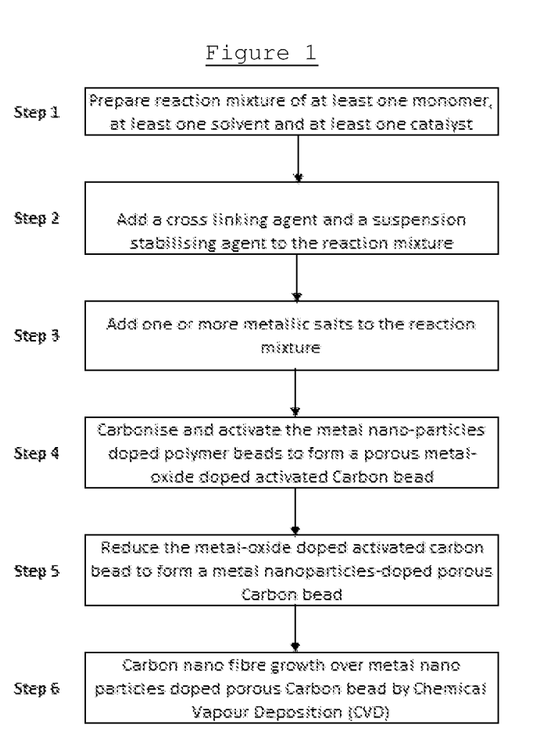
FIG. 1 is an example flow diagram of one embodiment of a method of forming metal nanoparticles-doped carbon beads for use as a catalyst in the process of the present invention.

FIG. 1 is a flow diagram which illustrates one embodiment of a method of forming metal nanoparticles-doped carbon beads for use as a catalyst in the process of the present invention. Step (i) of the process for making said catalyst takes place in steps 1-3 of FIG. 1. Step (ii) of the process for making said catalyst takes place in steps 4 and 5 of FIG. 1. Optional step (iii) of the process for making said catalyst takes place in step 6 of FIG. 1.

Figure 2:
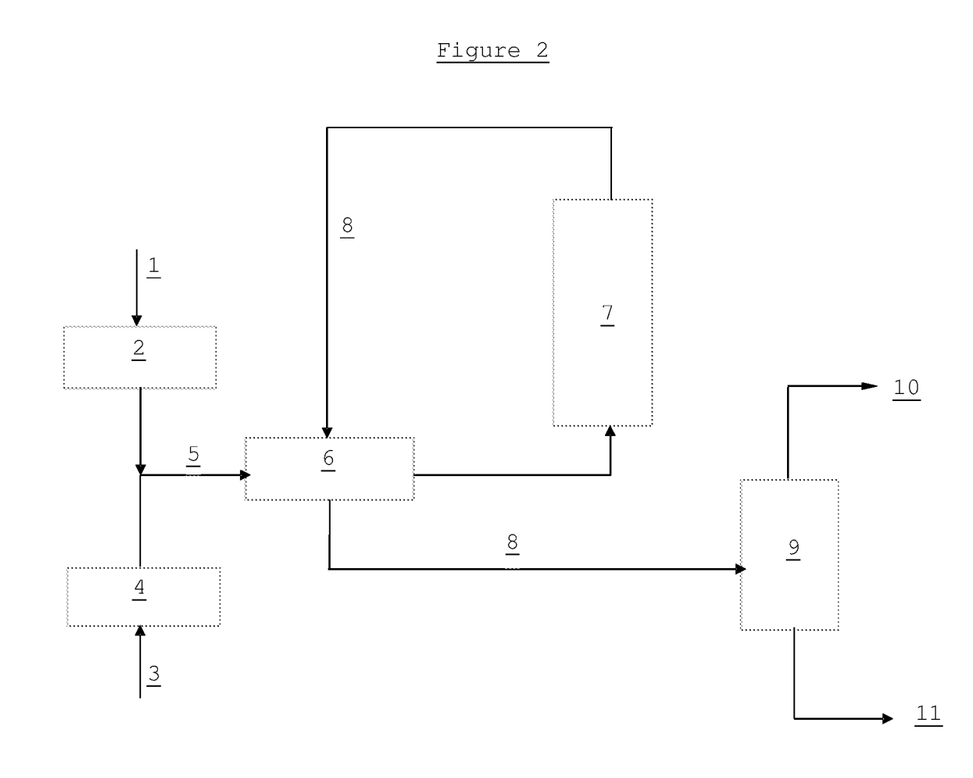
FIG. 2 is a diagram showing the waste water purification process of the present invention.

FIG. 2 shows the waste water purification process of the present invention. The process of the present invention may be operated in a continuous or batch manner.

Catalytic wet oxidation involves mixing an air or oxygen stream 1 at a high pressure (via a compressor 2) into the waste water feed (3) which is sent through a booster pump (4). The air-waste water mixture 5 is passed through a heat exchanger (6) to the reactor (7). The reactor can have an upflow or a downflow configuration. Inside the rector, the oxidation reactions take place under given operating conditions. The product stream 8 leaves the reactor 7 via the same heat exchanger 6 to a high pressure liquid gas separator 9 where the gas phase 10 is separated from the liquid phase 11. The treated waste water (11) is sent for various applications and the gas (10) is sent to the furnace. The final water product 11 may optionally undergo further purification treatment depending on the final COD specifications that it is required to meet.

The amount of catalyst present may be conveniently selected depending on the starting COD content of the water to be treated and the required COD reduction after the purification has been applied. However, the catalyst is typically present in the process of the present invention in an amount in the range of from 1 to 8 g/L of waste water.

As hereinbefore described, in the preferred embodiment of the invention, the process is operated such that the waste water stream achieves advantageous COD reduction both in absolute and percentage terms, without the need for any pre-treatment purification of the waste water prior to implementation of the process of the present invention.

It is preferable to perform the treatment of the present invention for the minimum time necessary to achieve the required COD reduction. In a particular embodiment of the present invention, the waste water treatment is carried out for a period of less than 10 hours, preferably less than 8 hours and more preferably in the range of from 4 to 8 hours.

Dependent upon the starting COD of the waste water stream and the intended subsequent use of the waste water stream, in some embodiments of the present invention, optional post-treatment steps may be performed. However, for many applications, the high COD reductions achieved by the process of the present invention are sufficient for further post-treatment steps to not be required.

After use in the process of the present invention, spent catalyst may be regenerated and used for subsequent cycles depending on the residual catalytic activity of the catalyst after individual cycles.

As mentioned above, the present waste water treatment process may be conveniently integrated with a SM/PO process.

EXAMPLES

Example 1

Preparation of Copper Nanoparticle-Doped Polymer Beads ("Cu-PhB") by Suspension Polymerization The copper nanoparticle-doped polymer beads of Example 1 were prepared by suspension polymerization.

The polymerization reaction was performed in a 2-litre three-neck glass vessel mounted over a heating mantle and equipped with a reflux condenser, thermometer and continuous stirrer.

A detailed description of the equipment that may be used for the polymerization reaction can be found in Chem. Eng. Sci. 3591 (2010).

Figure 3:
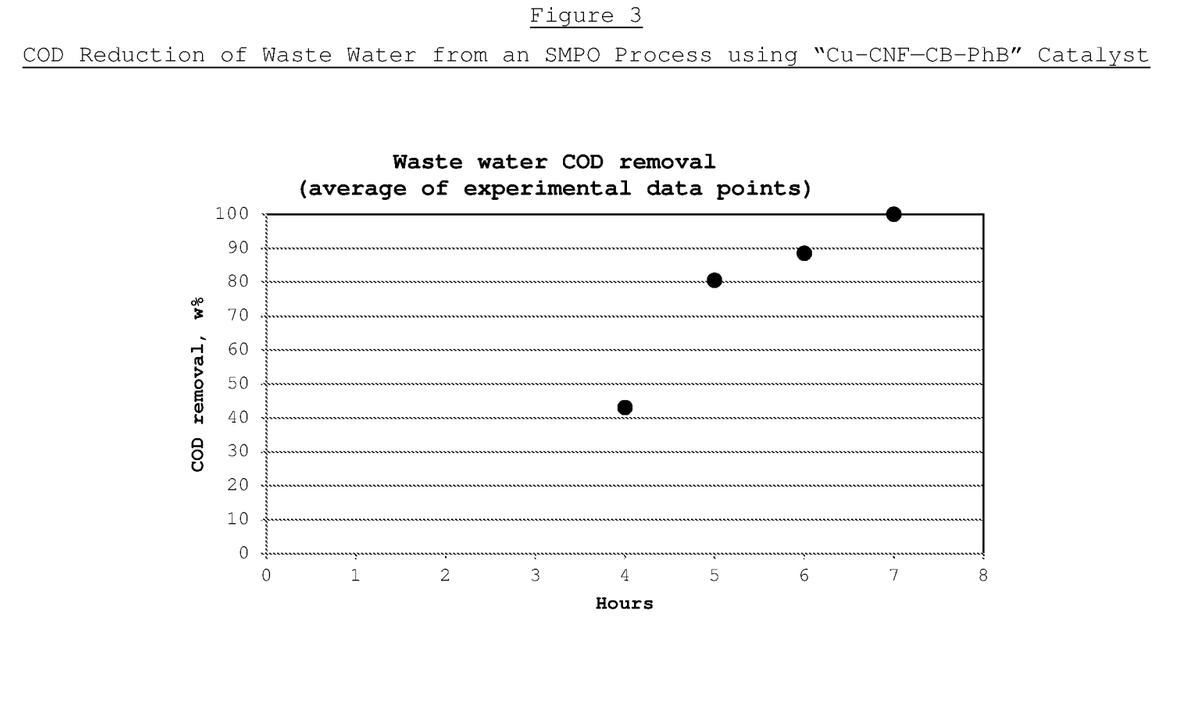
FIG. 3 demonstrates the advantageous results obtained by employing the process of the present invention.

Furthermore, FIG. 3 of US 2015/0056260 A1 illustrates an example apparatus that may be conveniently used for preparing metal nanoparticle-doped carbon beads by suspension polymerization.

A solution of phenol (50 g) as monomer, formaldehyde (63 ml) as solvent and triethylamine (TEA) (1.5 ml) as polymerization catalyst was prepared. Thereafter, the mixture of phenol, formaldehyde and TEA was stirred (370-410 rpm) at room temperature (approx. 30° C.) for 8 hours to prepare a homogenous solution.

After 8 hours, 200 ml of water was mixed into the reaction mixture. After a further 30 minutes, 3.5 g of hexamethylenetetramine (HMTA) was added as the cross-linking agent and the reaction mixture was simultaneously heated at 3° C./min until the temperature reached 100° C. Approx. 45 minute after the addition of HMTA, 3.5 g of PVA (95% hydrolyzed polyvinyl alcohol, average molecular weight 95000) was added as a suspension stabilizing agent.

After 25-30 minutes, 4 g of copper nitrate ($Cu(NO_3)_2 \cdot 3H_2O$) was added. After 30 minutes, the reaction was stopped by switching off the heater. The reaction mixture was then allowed to cool to room temperature.

After cooling, the reaction mixture was filtered to separate solids beads from the residual liquid. The beads were then washed 2-3 times with water, methanol and acetone and then dried at room temperature for 12 hours.

The formed copper nanoparticle-doped polymer beads (hereinafter referred to as "Cu-PhB") were then sieved and a yield of approx. 50 g was obtained.

Example 2

Preparation of Copper Nanoparticles-Doped Porous Carbon Beads ("Cu-CB-PhB")

Copper nanoparticle-doped polymer beads ("Cu-PhB") prepared by the method of Example 1 were carbonized at 900° C. for 2 hours in presence of nitrogen, and then activated at 900° C. for 1 hour in presence of steam at 0.1-0.15 MPa pressure to form copper oxide doped porous activated carbon beads (hereinafter referred to as "CuO-CB-PhB").

Thereafter, the copper oxide doped porous activated carbon beads ("CuO-CB-PhB") were reduced at 350° C. for 2 hours in presence of hydrogen at 0.1-0.15 MPa pressure to form copper nanoparticles-doped porous carbon beads (hereinafter referred to as "Cu-CB-PhB").

Example 3

Preparation of Copper Nanoparticles-Doped Carbon Nanofiber Porous Carbon Beads ("Cu-CNF-CB-PhB")

The copper nanoparticles-doped porous carbon beads ("Cu-CB-PhB") of Example 2 were subsequently subjected to Chemical Vapor Deposition (CVD) at 350° C. for 30 minutes in presence of acetylene in order to decorate the beads with multi-scale carbon structures in the form of carbon nanofibers (CNFs) at 0.1-0.15 MPa pressure.

The prepared copper nanoparticles-doped carbon nanofiber porous carbon beads (hereinafter referred to as "Cu-CNF-CB-PhB") were then employed as a catalyst in the subsequent testing described in Example 4.

Example 4

"Cu-CNF-CB-PhB" Catalyst Testing

A waste water stream was obtained from a commercial SMPO process for testing in accordance with the process of the present invention. The waste water stream had an initial COD of 119,952 mg/L.

Testing was carried out at a temperature of 210° C., oxygen pressure of 1.4 MPa (total pressure 7 MPa) and a pH in the range of 5.5-8.2. The volume of sample treated was 150 ml, using a mixing speed of 200 rpm and 3 g/L of the "Cu-CNF-CB-PhB" catalyst obtained in Example 3.

The experimental set-up utilised a nickel alloy (available under the trade designation "Inconel") reactor (73 mm diameter×210 mm height×7 mm wall-thickness), equipped with a heater and a thermocouple. It also included a motor with the variable speed-controller, connected to the impeller for agitating the solution at a constant speed (rpm). A PID temperature controller was used for maintaining the reaction temperature. Provisions also existed in the reactor for releasing excess pressure via a rupture disc and a vent valve. A pressure gauge was used to monitor the reactor pressure. Water test samples were periodically drawn from the reactor, using a liquid sampling valve. The gases required for the reaction, namely, oxygen for oxidation and nitrogen for purging, were delivered from the cylinders equipped with the pressure gauge and regulator. Before delivery to the reactors, the gases were passed through packed beds of silica, which were installed in-line, to remove any impurities present in the gas cylinders. A water-cooling coil was used in the reactor to cool the test solution after the reaction was completed.

Four hemispherical baskets (10 mm diameter), fabricated from stainless steel-mesh were used as the catalyst (beads) holder in the reactor. The baskets, open at one end, were welded to a SS circular disk (40 mm diameter×1.5 mm thick). Each basket could hold 1 g of the prepared materials in this study. The basket-mesh (42 mesh size) allowed a free flow of the test solution in and out of the basket during stirring, but firmly held the beads. The disk-basket assembly was fitted to a SS-flange (~40 mm diameter) using nuts and bolts. The assembled catalyst holder, screw-fitted onto the motor-shaft, thus simultaneously served as the impeller. The configured assembly was easily dismantled, cleaned and re-filled with the fresh catalysts before starting a new test.

In a routine experiment, the reactor was purged with $N_2$ for 15 min before starting the reaction. Equal amounts of the prepared catalyst were filled in the four catalyst-sample holders. The reactor was filled with the 300 ml test solution. The speed of the stirrer was set constant. The lid was closed and the reactor (with lid closed) was filled with $O_2$ gas. The solution was then heated to the oxidation temperature. During the reaction, test samples (~3 cm³) were periodically drawn from the liquid sampling valve for the analysis. All experiments were performed in duplicate to check the reproducibility and all data reported in this study were within ±5% variation.

Results

Tables 1 and 2 show the results of treating the waste water with the catalyst of Example 3.

Table 1 depicts the typical properties of the waste water generated from the commercial PO producing plant:

TABLE 1

Typical Properties of Waste Water Used in Experiments

| Property | Unit of Measurement | Values |
|---|---|---|
| Starting COD | mg/l | 80,000-125,000 |
| Sum of organic sodium salts (formate, acetate, propionate, benzoate) | mg/l | 35,000-42,000 |
| Propylene glycol | mg/l | 4000-9000 |
| Phenol | mg/l | 1500 |
| Aromatic oxygenates (mainly $C_8/C_9$) | mg/l | 3000-3500 |
| Density | kg/m³ | 1030-1050 |
| pH | | ~10 |
| $Na^+$ in $Na_2CO_3/HCO_3$ | mg/l | 8500-10,000 |

Table 2 shows the outcomes of COD reduction from the feed waste water sample whose properties are given in Table 1.

It can be seen that despite the high starting COD of the waste water stream, the COD of the waste water has reduced by 100% after only 7 hours, demonstrating the surprising efficiency of the process of the present invention.

TABLE 2

| Reaction time (hours) | % COD reduction |
|---|---|
| 4 | 43 |
| 5 | 80.5 |
| 6 | 88.5 |
| 7 | 100 |

FIG. 3 illustrates the results of Table 2 in a graphical manner.

That which is claimed is:

1. A process for treating waste water from an industrial process for producing propylene oxide, which process comprises subjecting the waste water to a catalytic wet oxidation treatment in the presence of a catalyst comprising metal nanoparticles-doped porous carbon beads, wherein the metal nanoparticles are incorporated within the beads.

2. The process according to claim 1, wherein the metal is selected from one or more of aluminium, iron, nickel, copper, silver, cobalt, molybdenum, gold and platinum.

3. The process according to claim 1, wherein the metal is selected from one or more of iron, nickel, copper and cobalt.

4. The process according claim 1, wherein the catalyst further comprises carbon nanofibers.

5. The process according to claim 1, wherein the catalyst has been prepared by a method comprising:
(i) preparing a mixture of one or more aromatic alcohol monomers and/or non-aromatic monomers, solvent, polymerization catalyst, crosslinking agent, suspension stabilizing agent and one or more metal salts, under conditions sufficient to produce polymeric beads doped with one or more metals or salts thereof; and
(ii) carbonizing, activating and then reducing the polymeric beads produced in step (i) to produce metal nanoparticles-doped porous carbon beads.

6. The process according to claim 5, wherein the catalyst has been prepared by a method further comprising:
(iii) subjecting the metal nanoparticles-doped porous carbon beads to chemical vapour deposition in the presence of a carbon source to produce metal nanoparticles-doped porous carbon beads which comprise carbon nanofibers.

7. The process according to claim 6, wherein the carbon source is selected from acetylene, benzene, xylene and toluene.

8. The process according to claim 5, wherein the aromatic alcohol monomers and non-aromatic monomers are selected from one or more of phenol, vinyl benzyl alcohol, cresol, butylphenol and methyl methacrylate (MMA).

9. The process according to claim 5, wherein the suspension stabilising agent is selected from one or more of poly vinyl alcohol (PVA), gum acacia powder (GAP) and poly vinyl pyrodinone.

10. The process according claim 1, wherein the waste water treatment is carried out at a temperature in the range of from 120 to 300° C. and a pressure in the range of from 2 to 15 MPa.

* * * * *

UNITED STATES PATENT AND TRADEMARK OFFICE
CERTIFICATE OF CORRECTION

PATENT NO. : 11,168,011 B2
APPLICATION NO. : 16/303695
DATED : November 9, 2021
INVENTOR(S) : Arian Van Mourik et al.

Page 1 of 1

It is certified that error appears in the above-identified patent and that said Letters Patent is hereby corrected as shown below:

In the Drawings

On sheet 1 of 3, in Figure 1, Line 7, delete "nano-particles" and insert -- nanoparticles --, therefor.

In the Specification

In Column 5, Line 20, delete "treatment treatment" and insert -- treatment --, therefor.

In Column 7, Lines 20-21, delete "poly vinyl pyrodinone." and insert -- poly vinyl pyrrolidone. --, therefor.

In Column 9, Lines 50-51, delete "treatment treatment" and insert -- treatment --, therefor.

In the Claims

In Column 14, Line 16, in Claim 4, after "according" insert -- to --.

In Column 14, Lines 49-50, in Claim 9, delete "poly vinyl pyrodinone." and insert -- poly vinyl pyrrolidone. --, therefor.

In Column 14, Line 51, in Claim 10, after "according" insert -- to --.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*